(12) United States Patent
Lee

(10) Patent No.: US 8,769,861 B2
(45) Date of Patent: Jul. 8, 2014

(54) FISHING POLE WITH AN ADJUSTABLE LENGTH

(75) Inventor: Wen-Hsiang Lee, Taichung County (TW)

(73) Assignee: Ningbo Ever Winner Industrial Fishing Tackle Co., Ltd., Zhe-Jiang (CN)

( * ) Notice: Subject to any disclaimer, the term of this patent is extended or adjusted under 35 U.S.C. 154(b) by 754 days.

(21) Appl. No.: 12/978,795

(22) Filed: Dec. 27, 2010

(65) Prior Publication Data

US 2012/0159834 A1 Jun. 28, 2012

(51) Int. Cl.
*A01K 87/02* (2006.01)

(52) U.S. Cl.
USPC ..................................... 43/18.1 CT

(58) Field of Classification Search
CPC .............................. A01K 87/02; A01K 87/025
USPC .......................... 43/18.1 CT, 18.1 HR, 18.1 R
See application file for complete search history.

(56) References Cited

U.S. PATENT DOCUMENTS

| | | | | |
|---|---|---|---|---|
| 1,870,976 A | * | 8/1932 | Welch .......................... | 43/18.1 R |
| 2,874,507 A | * | 2/1959 | Faber et al. ............... | 43/18.1 CT |
| 3,614,143 A | * | 10/1971 | Stevens .......................... | 403/334 |
| 3,878,012 A | * | 4/1975 | Williams ........................ | 156/94 |
| 4,490,063 A | * | 12/1984 | Aho ............................ | 403/109.8 |
| 4,575,277 A | * | 3/1986 | Dickey .......................... | 403/361 |
| 5,175,952 A | * | 1/1993 | Yamato ....................... | 43/18.1 R |
| 5,259,140 A | * | 11/1993 | Epperson ................. | 43/18.1 CT |
| 5,479,872 A | * | 1/1996 | Hulett .......................... | 114/361 |
| 5,568,922 A | * | 10/1996 | Siddle .......................... | 463/47.7 |
| 5,813,581 A | * | 9/1998 | Hellweg ........................ | 224/251 |
| 6,056,643 A | * | 5/2000 | Wilmoth, III ................. | 463/47.7 |
| 6,306,040 B1 | * | 10/2001 | Chang .......................... | 463/47.7 |
| D647,993 S | * | 11/2011 | Reid ............................ | D21/804 |
| 2007/0072684 A1 | * | 3/2007 | Parsons ........................ | 463/47.7 |

FOREIGN PATENT DOCUMENTS

| FR | 1540485 A | * | 9/1968 | .......... A01K 87/025 |
|---|---|---|---|---|
| FR | 2064581 A | * | 7/1971 | .......... A01K 87/025 |

* cited by examiner

*Primary Examiner* — Kimberly Berona
(74) *Attorney, Agent, or Firm* — McNees Wallace & Nurick LLC

(57) ABSTRACT

A fishing pole includes an outer tubular member having a tubular wall defining an axial hole, and an inner rod member inserted telescopically and axially into the outer tubular member. The tubular wall has small and large diameter wall sections, and a shoulder between the small and large diameter wall sections. The inner rod member has an extension portion extending out of the outer tubular member through the small diameter wall section, an enlarged engaging end portion provided at one end of the extension portion, a plurality of angularly spaced-apart openings extending axially from the enlarged engaging end portion toward the extension portion, and a plurality of compressible resilient pawl plates each extending axially between two adjacent ones of the openings. The resilient pawl plates are compressed within the large diameter wall section, and frictionally contact an inner surface of the large diameter wall section.

5 Claims, 6 Drawing Sheets

FISHING POLE WITH AN ADJUSTABLE LENGTH

BACKGROUND OF THE INVENTION

1. Field of the Invention

This invention relates to a fishing pole, and more particularly to a fishing pole with an adjustable length.

2. Description of the Related Art

Referring to FIG. 1, a conventional fishing pole includes an outer tubular member 1, an inner rod member 2, and a plug 3 fixed to one end of the outer tubular member 1. The inner rod member 2 has one end inserted into the plug 3, and the other end extending out of the outer tubular member 1. A positioning ring 201 is provided on an outer surface of the inner rod member 2 for positioning the inner rod member 2 within the outer tubular member 1. Although the inner rod member 2 can be positioned within the outer tubular member 1, the inner rod member 2 and the outer tubular member 1 are not adjustable relative to each other, so that the length of the conventional fishing pole is fixed, and cannot be adjusted according to user requirements.

SUMMARY OF THE INVENTION

Therefore, the object of the present invention is to provide a fishing pole that is capable of overcoming the aforementioned drawback of the prior art.

According to this invention, a fishing pole includes an outer tubular member having a tubular wall defining an axial hole, and an inner rod member inserted telescopically and axially into the outer tubular member. The tubular wall has small and large diameter wall sections, and a shoulder between the small and large diameter wall sections. The inner rod member has an extension portion extending out of the outer tubular member through the small diameter wall section, an enlarged engaging end portion provided at one end of the extension portion, a plurality of angularly spaced-apart openings extending axially from the enlarged engaging end portion toward the extension portion, and a plurality of compressible resilient pawl plates each extending axially between two adjacent ones of the openings. The resilient pawl plates are compressed within the large diameter wall section, and frictionally contact an inner surface of the large diameter wall section.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
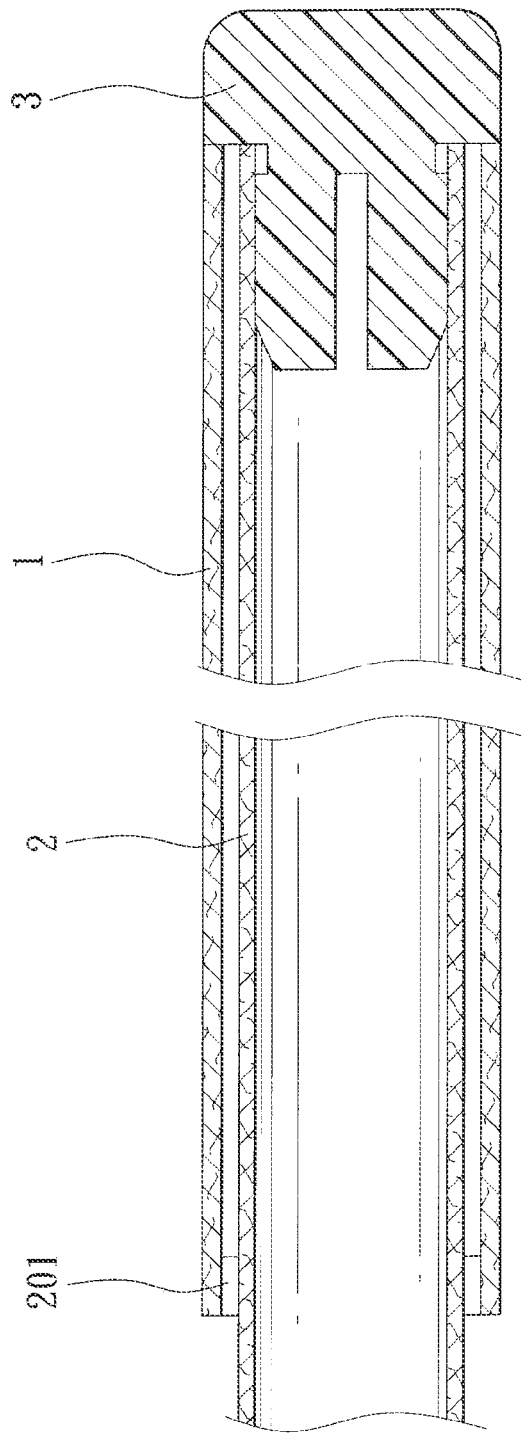
FIG. 1 is a fragmentary sectional view of a conventional fishing pole.

Before the present invention is described in greater detail, it should be noted that the same reference numerals have been used to denote like elements throughout the specification.

Figure 2:
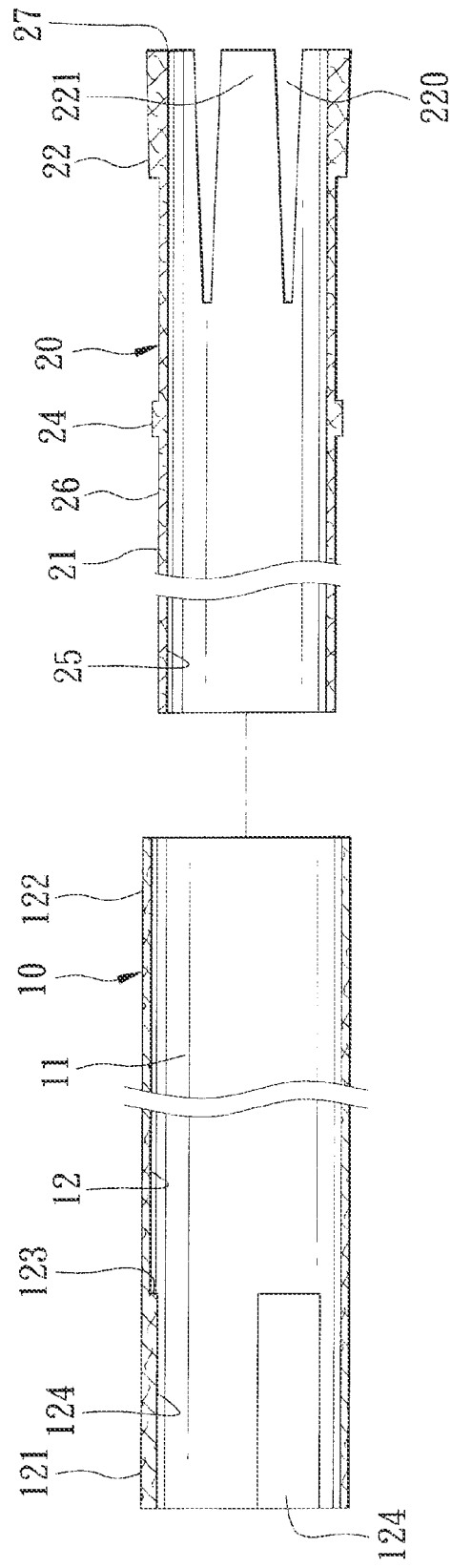
FIG. 2 is an exploded fragmentary sectional view of a fishing pole according to the first preferred embodiment of the present invention.
Figure 3:
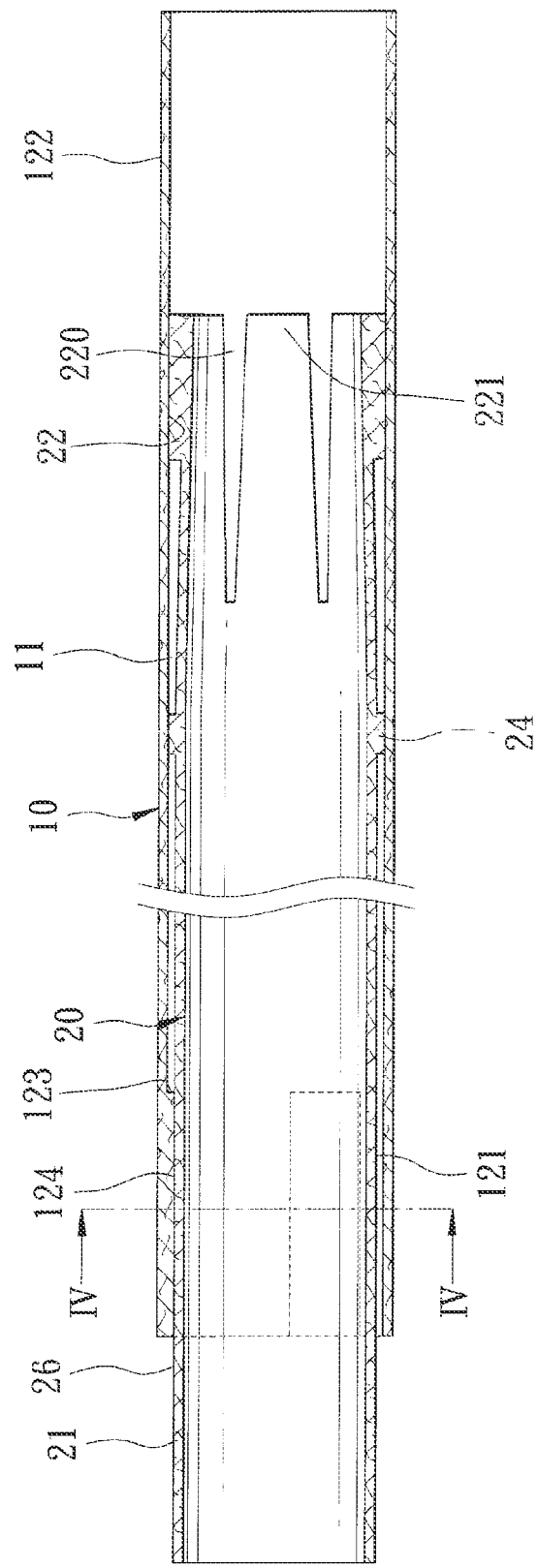
FIG. 3 is a fragmentary sectional view of the first preferred embodiment in an assembled state.

Referring to FIGS. 2 and 3, a fishing pole according to the first preferred embodiment of the present invention is shown to comprise an outer tubular member 10 and an inner rod member 20.

The outer tubular member 10 is substantially cylindrical, and has a tubular wall 12 defining an axial hole 11. The tubular wall 12 has a small diameter wall section 121, a large diameter wall section 122, and a shoulder 123 between the large and small diameter wall sections 121, 122. In this embodiment, the small diameter wall section 121 has a non-uniform thickness with a plurality of thickened portions 124 that project inwardly and that are annularly spaced apart from each other.

The inner rod member 20 is inserted telescopically and axially into the outer tubular member 10 via the axial hole 11, and has an extension portion 21 extending out of the outer tubular member 10 through the small diameter wall section 121, an enlarged engaging end portion 22 provided at one end of the extension portion 21 and having an outer diameter larger than that of the extension portion 21, a plurality of angularly spaced-apart openings 220 extending axially from the enlarged engaging end portion 22 toward the extension portion 21, and a plurality of compressible resilient pawl plates 221 each extending axially between two adjacent ones of the openings 220. In this embodiment, the inner rod member 20 is hollow, and has an inner surface 25 and an outer surface 26. An annular protrusion 24 projects radially and outwardly from the outer surface 26 of the inner rod member 20 at the extension portion 21, and is abuttable against the shoulder 123 so as to prevent the inner rod member 20 from moving out of the outer tubular member 10 through the small diameter wall section 121. The enlarged engaging end portion 22 has a distal end face 27 distal from the extension portion 21. The openings 220 extend axially and inwardly from the distal end face 27, and extend through the inner and outer surfaces 25, 26. Each opening 220 tapers inwardly from the distal end face 27 in a direction away from the distal end face 27.

Figure 4:
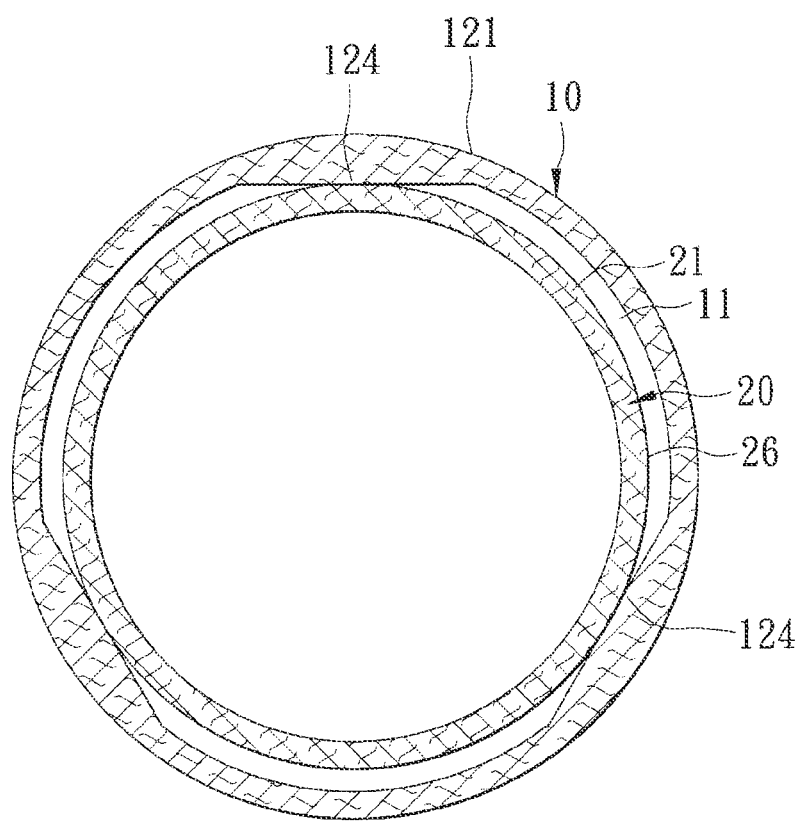
FIG. 4 is a sectional view of the first preferred embodiment taken along line IV-IV of FIG. 3.

Referring to FIGS. 3 and 4, when the inner rod member 20 is inserted into the outer tubular member 10, a portion of the extension portion 21 extends out of the outer tubular member 10 through the small diameter wall section 121, and the outer surface 26 of the inner rod member 20 is in frictional contact with the thickened portions 124 of the small diameter wall section 121. Further, although the outer diameter of the engaging end portion 22 is larger than an inner diameter of the large diameter wall section 122, through the presence of the openings 220, the engaging end portion 22 can be compressed and inserted into the large diameter wall section 122. At this time, the resilient pawl plates 221 store an expansion force. As the engaging end portion 22 extends into the large diameter wall section 122, the expansion force of the resilient pawl plates 221 is released, and the engaging end portion 22 expands radially and outwardly. As a result, the resilient pawl plates 221 contact frictionally an inner surface of the large diameter wall section 122, thereby providing a frictional contact between the inner rod member 20 and the outer tubular member 10.

When the inner rod member 20 and the outer tubular member 10 are pulled slidably in opposite directions, the inner rod member 20 is prevented from sliding out of the outer tubular member 10 through abutment of the annular protrusion 24 against the shoulder 123. Further, through frictional contact between the thickened portions 124 of the small diameter wall section 121 and the outer surface 26 of the inner rod member 20 and between the resilient pawl plates 221 and the large diameter wall section 122, a stepless adjustment of the length of the fishing pole of the present invention can be achieved. Hence, a user can adjust the length of the fishing pole of the present invention according to his/her requirements.

It should be noted that the resilient pawl plates 221 and the annular protrusion 24 are formed on a blank of a hollow rod. A resin-saturated fabric that is 20 mm long and 1.1 mm thick is adhered to an outer portion of the blank at a position corresponding to the location of the engaging end portion 22, and an OPP tape is wound around the fabric. Another resin-saturated fabric that is 5 mm long and has a thickness that is smaller than an inner diameter of the axial hole 11 of the outer tubular member 10 by 0.1 mm is adhered to the outer portion of the blank at a position corresponding to the location of the annular protrusion 24, and another OPP tape is wound around the fabric. Subsequently, the blank is heated, the OPP tapes are removed, the extension portion 21 and the engaging end portion 22 are ground, the engaging end portion 22 is machined so as to form the openings 220 and the resilient pawl plates 221, and finally, the outer surface 26 of the inner rod member 20 at the extension portion 21 is provided with a surface coating. An outer diameter of the coated extension portion 21 is controlled to be smaller than the inner diameter wall section 121 by 0.01-0.02 mm.

Figure 5:
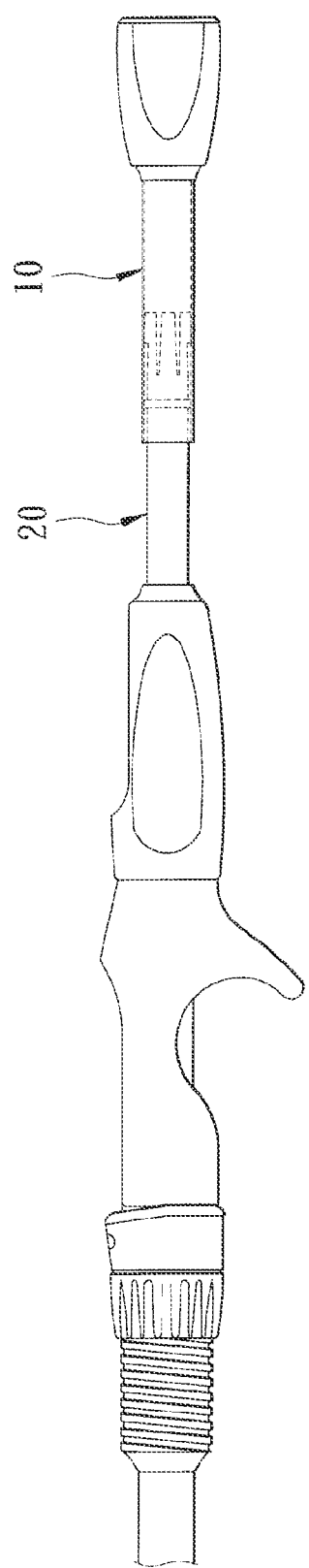
FIG. 5 is a schematic view of the fishing pole of the first preferred embodiment in a state of use.

As shown in FIG. 5, the inner rod member 20 and the outer tubular member 10 of this embodiment may be a handle of the fishing pole and may be connected to other parts of the fishing pole.

Figure 6:
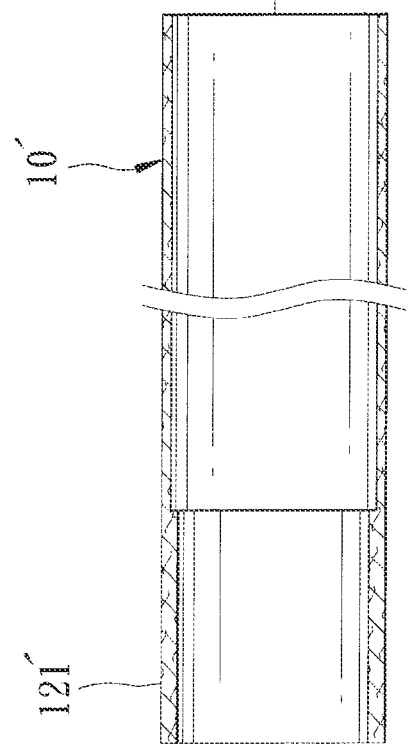
FIG. 6 is an exploded fragmentary sectional view of a fishing pole according to the second preferred embodiment of the present invention.

Referring to FIG. 6, a fishing pole according to the second preferred embodiment of the present invention is shown to be similar to the first preferred embodiment. However, in this embodiment, the small diameter wall section 121' of the outer tubular member 10' has a uniform thickness. The advantages of the first preferred embodiment can be similarly achieved using the second preferred embodiment.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A fishing pole comprising:
   an outer tubular member having a tubular wall defining an axial hole, said tubular wall having a small diameter wall section, a large diameter wall section, and a shoulder between said small and large diameter wall sections;
   an inner rod member inserted telescopically and axially into said outer tubular member and having an extension portion extending out of said outer tubular member through said small diameter wall section, an enlarged engaging end portion provided at one end of said inner rod member that is opposite to said extension portion, a plurality of angularly spaced-apart openings extending axially from said enlarged engaging end portion toward said extension portion, and a plurality of compressible resilient pawl plates each extending axially between two adjacent ones of said openings, said resilient pawl plates being compressed within said large diameter wall section and frictionally contacting an inner surface of said large diameter wall section; and
   said inner rod member further has an annular protrusion projecting radially and outwardly from an outer surface of said extension portion, said annular protrusion being abuttable against said shoulder to prevent said inner rod member from moving out of said outer tubular member through said small diameter wall section.

2. The fishing pole of claim 1, wherein said inner rod member is hollow, and has an inner surface and an outer surface, said enlarged engaging end portion having a distal end face distal from said extension portion, said openings extending axially and inwardly from said distal end face and extending through said inner and outer surfaces.

3. The fishing pole of claim 2, wherein each of said openings tapers inwardly from said distal end face in a direction away from said distal end face.

4. The fishing pole of claim 3, wherein said outer tubular member is substantially cylindrical, said small diameter wall section having a non-uniform thickness with thickened portions that project inwardly and that contact said inner rod member at annularly spaced apart positions.

5. The fishing pole of claim 3, wherein said outer tubular member is substantially cylindrical, said small diameter wall section having a uniform thickness.

* * * * *